(12) United States Patent
Kharul et al.

(10) Patent No.: US 8,715,783 B2
(45) Date of Patent: May 6, 2014

(54) POROUS ABPBI [POLY (2, 5-BENZIMIDAZOLE)] MEMBRANE AND PROCESS OF PREPARING THE SAME

(75) Inventors: Ulhas Kharul, Pune (IN); Harshada Lohokare, Pune (IN)

(73) Assignee: Council of Scientific and Industrial Research (CISR), New Delhi (IN)

( * ) Notice: Subject to any disclaimer, the term of this patent is extended or adjusted under 35 U.S.C. 154(b) by 0 days.

(21) Appl. No.: 13/580,755

(22) PCT Filed: Feb. 22, 2011

(86) PCT No.: PCT/IB2011/000334
§ 371 (c)(1),
(2), (4) Date: Nov. 13, 2012

(87) PCT Pub. No.: WO2011/104602
PCT Pub. Date: Sep. 1, 2011

(65) Prior Publication Data
US 2013/0053467 A1    Feb. 28, 2013

(30) Foreign Application Priority Data

Feb. 26, 2010    (IN) .............................. 434/DEL/2010

(51) Int. Cl.
*C08J 9/28* (2006.01)
*C08G 73/18* (2006.01)

(52) U.S. Cl.
USPC ..... 427/373; 427/336; 427/372.2; 427/393.5; 521/50; 521/182; 521/183; 521/184

(58) Field of Classification Search
None
See application file for complete search history.

(56) References Cited

U.S. PATENT DOCUMENTS 4,842,740 A    6/1989    Chung et al.

FOREIGN PATENT DOCUMENTS

DE    10 2009 001137 A1    5/2010
DE    10 2009 001141 A1    5/2010

OTHER PUBLICATIONS

"Synthetic Membranes—Preparation, Structure, and Application" authored by Pusch et al. and published in Angew. Chem. Int. Ed. (1982) 21, 660-685.*
International Search Report for International Application No. PCT/IB2011/000334 mailed on Sep. 1, 2011.
Zheng et al., "Preparation and characterization of porous poly(2,5benzimidizole) (ABPBI) membranes using surfactants as templates for polymer electrolyte membrane fuel cells," *International Journal of Hydrogen Energy*, Elsevier Science Publishers B.V., Barking, GB, vol. 35, No. 8, Feb. 24, 2010, pp. 3475-3750.
Asensio et al., "Recent Developments on Proton Conducting Poly(2,5-benzimidizole) (ABPBI) Membranes for High Temperature Polymer Electrolyte Membrane Fuel Cells," *Fuel Cells*, vol. 5, No. 3, 2005, pp. 336-343.
Asensio et al., "Polymer Electrolyte Fuel Cells Based on Phosphoric Acid-Impregnated Poly(2,5-benzimidizole) Membranes," Journal of the Electrochemical Society, vol. 151, No. 2, Jan. 9, 2004, pp. A304-A310.
Asensio et al., "Proton-conducting membranes based on poly(2,5-benzimidizole) (ABPBI) and phosphoric acid prepared by direct acid casting," *Journal of Membrane Science*, Elsevier Scientific Publication Company, Amsterdam, NL, vol. 241, No. 1, Sep. 15, 2004, pp. 89-93.
Wang et al., "Fabrication of polybenzimidazole (PBI) nanofiltration hollow fiber membranes for removal of chromate,"*Journal of Science Membrane*, ScienceDirect, Elsevier B.V., 2006, vol. 281, pp. 307-315.
Wang et al., "Polybenzimidazole Nanofiltration Hollow Fiber for Cephalexin Separation," *AIChE Journal*, Wiley InterScience, Apr. 2006, vol. 52, No. 4, pp. 1363-1377.
Li et al., "Approaches and Recent Developments of Polymer Electrolyte Membranes for Fuel Cells Operating above 100° C.," *Chem. Mater.*, American Chemical Society, 2003, vol. 15, pp. 4896-4915.

* cited by examiner

*Primary Examiner* — Marc Zimmer
(74) *Attorney, Agent, or Firm* — Merchant & Gould P.C.

(57) ABSTRACT

The present invention relates to a porous ABPBI (phosphoric acid doped poly(2,5-benzimidazole)) membrane and process of preparing the same. A stable porous ABPBI (Phosphoric Acid Doped Poly(2,5-benzimidazole)) membrane stable to acids, bases, solvents and autoclaving is disclosed. The membrane finds use for separation of solutes in solution in acids, bases and solvents.

10 Claims, 2 Drawing Sheets

POROUS ABPBI [POLY (2, 5-BENZIMIDAZOLE)] MEMBRANE AND PROCESS OF PREPARING THE SAME

This application is a National Stage Application of PCT/IB2011/000334, filed 22 Feb. 2011, which claims benefit of Ser. No. 434/DEL/2010, filed 26 Feb. 2010 in India and which applications are incorporated herein by reference. To the extent appropriate, a claim of priority is made to each of the above disclosed application.

FIELD OF THE INVENTION

The present invention relates to a porous ABPBI (phosphoric acid doped poly(2,5-benzimidazole)) membrane and process of preparing the same. More particularly, the present invention provides a process for the preparation of ABPBI based porous membranes. The ABPBI porous membranes have excellent stability towards strong acids, bases, common organic solvents and harsh environmental conditions.

BACKGROUND AND PRIOR ART

It is known that Polybenzimidazole(PBI) based on diaminobenzidine (DAB) and isophthalic acid (IPA) as PBI-I and is soluble in polar aprotic solvents such as N,N-dimethyl acetamide [Li et al. Chem. Mater. 15 (2003) pp. 4896-4915]; while AB(polybenzimidazole) (ABPBI) is soluble only in strong acids such as sulfuric acid, formic acid, trifluoroacetic acid, phosphoric and poly(phosphoric acid) [Asensio et al. Fuel cells 5 No. 3 (2005) pp. 336-343]. Monomer cost and synthesis time for ABPBI are much lower than that for PBI-I.

Chung et al. in U.S. Pat. No. 4,842,740 disclosed a membrane prepared from the blend of polyarylates with PBI-I polymer. The addition of polyarylate to the polybenzimidazole membrane allows the composition to be more thermally processable and less susceptible to moisture. These membranes show high regeneration capacity while retaining good flux ranges.

Asensio et al. in J. Electrochem. Soc. 151 (2) (2004) pp. A304-A310 prepared membrane based on poly(2,5-benzimidazole) (ABPBI) by simultaneously doping and casting from ABPBI/phosphoric acid/methane sulfonic acid solution. However, these membranes are used for polymer electrolyte membrane fuel cell (PEMFC).

Wang et al. in AIChe 52 (2006) pp. 1363-1377 reported PBI based nanofiltration (NF) membranes (hollow fibers) with mean effective pore radius of 0.348 nm for cephalexin separation, which was dependent on the pore size and the electrostatic interactions between solute and the membrane.

Wang et al, J. Membr. Sci. 281 (2006) pp. 307-315 prepared PBI based NF membranes with molecular weight cutoff (MWCO) of 525 Da exhibited V-shaped chromate rejection curve with an increase in pH.

The above prior arts show PBI based porous membranes are based on (poly-2,2'-(m-phenylene)-5,5'-bibenzimidazole) (PBI-I) polymer. However, these PBI membranes suffer from drawbacks with respect to stability and solubility in solvents such as NaOH (2.5N) and $H_2SO_4$ (25N). Dense ABPBI membranes with good thermo chemical properties are known for PEMFC applications, but are not known for their stability towards strong acid, bases and organic solvents.

Therefore there is a clear need in prior art for porous ABPBI membranes with stability to acids, bases and solvents. Further the need for porous ABPBI membranes that can withstand concentrated acid, base and organic solvents under harsh operating conditions has not been addressed by prior art documents.

OBJECTIVES OF THE PRESENT INVENTION

The main objective of the present invention is to provide stable porous ABPBI membrane that can be used for separation of solutes from solutions in acids, bases and organic solvents.

Another objective of the invention is to prepare membrane by varying its membrane preparation parameters to improve membrane performance.

Yet another objective of the present invention to provide a single membrane which has a potential to withstand harsh environmental conditions such as concentrated acid, base, organic solvents and autoclaving conditions without need of any treatment processes such as cross linking, annealing and such like.

SUMMARY OF THE INVENTION

Accordingly, the present invention relates to stable porous ABPBI (Phosphoric Acid Doped Poly(2,5-benzimidazole)) membrane. The present invention also provides a method for the preparation of porous ABPBI membrane. This porous ABPBI membrane is stable to acids, bases, solvents and autoclaving. The membrane is stable to 25 N sulfuric acid at ambient and 2.5N sodium hydroxide at 100° C. The membrane of the present invention finds its use for separation of solutes in solution in acids, bases and solvents.

Also, the present invention relates to another embodiment of the present invention, a process for the preparation of the porous ABPBI membrane as claimed in claim 1, wherein said process comprises:
 a. dissolving ABPBI polymer in a solvent to form dope solution;
 b. casting a film of dope solution as obtained in step (a) optionally on a porous support;
 c. holding film as obtained in step (b) in air up to 5 minutes in ambient condition and
 d. coagulating film as obtained in step (c) in a non solvent bath at temperature up to 150° C. to obtain porous membrane.

BRIEF DESCRIPTION OF TABLES

Figure 1:
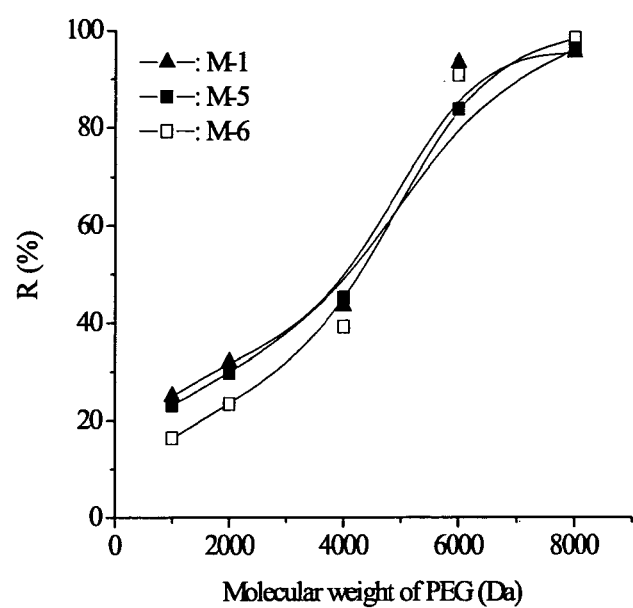
FIG. 1 exhibit rejection (R) of ABPBI membranes prepared by varying polymer concentration in dope solution and non-solvent.

Table 1 shows water flux analysis of membranes prepared using different porous supports at 1 bar pressure.

Table 2 shows the effect of air dry time and coagulation bath temperature on membrane flux.

Table 3 shows the stability of membrane M-6 towards organic solvents.

Table 4 shows hexane stability of membranes prepared using different porous supports.

Table 5 shows the change in water flux after treatment of concentrated acid and base.

DETAILED DESCRIPTION OF THE INVENTION

While the invention is susceptible to various modifications and alternative forms, specific aspect thereof has been shown by way of examples and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The Applicants would like to mention that the examples are drawn to show only those specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a composition, process that comprises a list of ingredients does not include only those ingredients but may include other ingredients not expressly listed or inherent to such composition or process. In other words, one or more elements in a product or process proceeded by "comprises . . . a" does not, without more constraints, preclude the existence of other elements or additional elements in the product or process.

In the following detailed description of the aspects of the invention, reference is made to the accompanying examples that form part hereof and in which are shown by way of illustration specific aspects in which the invention may be practiced. The aspects are described in sufficient details to enable those skilled in the art to practice the invention, and it is to be understood that other aspects may be utilized and that charges may be made without departing from the scope of the present invention. The following description is, therefore, not to be taken in a limiting sense, and the scope of the present invention is defined only be the appended claims.

Accordingly, the present invention relates to stable porous ABPBI (Phosphoric Acid Doped Poly(2,5-benzimidazole)) membrane. The present invention also provides a method for the preparation of porous ABPBI membrane. This porous ABPBI membrane is stable to acids, bases, solvents and autoclaving. The membrane is stable to 25 N sulfuric acid at ambient and 2.5N sodium hydroxide at 100° C. The membrane of the present invention finds its use for separation of solutes in solution in acids, bases and solvents.

One aspect of the present invention, wherein a porous ABPBI membrane is stable to acids, bases, organic solvents and autoclaving.

Another aspect the present invention, wherein said membrane is stable to organic solvents comprising of protic and aprotic polar solvents and non polar solvents.

Yet another aspect of the present invention, wherein said membrane is stable in concentrated inorganic acids.

Yet another aspect of the present invention, wherein said membrane is stable in concentrated base solutions.

Yet another aspect of the present invention, wherein the concentrated acid is 25 N sulfuric acid and the concentrated base is 2.5N sodium hydroxide.

Still another aspect of the present invention, wherein the concentration of used ABPBI is up to 15%.

In another aspect of the present invention, a process for the preparation of the porous ABPBI membrane as claimed in claim 1, wherein said process comprises:
    a. dissolving ABPBI polymer in a solvent to form dope solution;
    b. casting a film of dope solution as obtained in step (a) optionally on a porous support;
    c. holding film as obtained in step (b) in air up to 5 minutes in ambient condition and
    d. coagulating film as obtained in step (c) in a non solvent bath at temperature up to 150° C. to obtain porous membrane.

Yet another aspect of the present invention, wherein solvent used in step (a) is concentrated acid, selected from the group consisting of methane sulfonic acid, sulfuric acid, phosphoric acid, formic acid, trifluoro acetic acid, poly(phosphoric acid), alone or in combinations thereof.

Yet another aspect of the present invention, wherein, the ABPBI polymer is dissolved in solvent or combination of solvents.

Yet another aspect of the present invention, wherein the solvent is optionally heated to dissolve the polymer.

Yet another aspect of the present invention, wherein the membrane is casted on support selected from the group consisting of glass, polyester, polypropylene, polyethylene, polyetheretherketone, metallic plates and ceramics.

Yet another aspect of the present invention, wherein, the coagulation bath comprises non solvent, alone or in combination with a solvent.

Yet another aspect of the present invention, wherein, the non solvent is selected from water, alcohol, and base solution, preferably inorganic base.

Yet another aspect of the present invention, wherein, the solvent is acid selected from methane sulfonic acid, sulfuric acid, phosphoric acid, formic acid, trifluoro acetic acid, poly(phosphoric acid), alone or in combinations thereof.

In accordance with the invention, a porous ABPBI (Phosphoric Acid Doped Poly(2,5-benzimidazole)) membrane is disclosed. The membrane of the invention is up to 300μ in thickness comprising up to 15% by weight of the polymer.

The membrane of the invention is prepared by a process comprising:
    a. Dissolving ABPBI polymer in a solvent to form dope solution;
    b. Casting a film of dope solution optionally on a porous support;
    c. Coagulating the dope solution in the non solvent bath to obtain porous membrane.

The solvent for dissolving the ABPBI polymer is concentrated acids selected from methane sulfonic acid, sulfuric acid, phosphoric acid, formic acid, trifluoro acetic acid and poly(phosphoric acid). In one embodiment of the invention the solvent is used alone. In another embodiment of the invention, the solvents are used in combinations. The ABPBI polymer is dissolved in the solvent optionally with the aid of heat. The solution is heated to temperature up to 150° C. to dissolve the polymer in the solvent.

The membranes are casted by varying gelation temperature and air dry time prior to dipping in non solvent bath. Water and 0.5N NaOH are used as a non solvent.

The membrane is prepared by phase inversion. Supported membranes are prepared using appropriate porous support material selected from polyester, polypropylene, polyethylene, polyetheretherketone, glass, ceramic, metallic plates and such like. The dope solution may optionally comprise additives.

For the membrane formation, the film of polymer is exposed to air for different time durations up to 5 minutes. The resulting polymer film is placed in coagulation bath. The coagulation bath comprises non solvent or combination of non solvent and solvent. The non solvent is selected from water, base solution, preferably inorganic base and alcohols. The preferred non-solvent is water. The temperature of coagulation bath is maintained in the range of 0-150° C. The solvent is acid selected from methane sulfonic acid, sulfuric acid, phosphoric acid, formic acid, trifluoro acetic acid, poly (phosphoric acid), alone or in combinations thereof.

The membrane of the invention is stable to organic solvents comprising of protic and aprotic polar solvents and non polar solvents. The membrane is stable in concentrated inorganic acids and concentrated base solutions. The membrane is stable in 25 N sulfuric acid and 2.5N sodium hydroxide as exemplified herein. The membrane is stable at high pressure and high temperature conditions as exemplified herein in autoclaving conditions.

The effect on water flux of the membrane of the invention is studied after treatment of membrane such as acid, base, organic solvent and autoclaving and compared with the initial flux exhibited by the membrane. The membrane of the invention is found to be stable to various treatment conditions subjected to with no substantial effect on flux as exemplified herein.

The membrane of the invention finds its use for separations of solute from solvents. The solutes are in solvents selected from acids, bases and organic solvents. The solvents for the solutes are used alone or in combinations of said solvents. The solutes are selected from carboxylic acids, polymers, high molecular weight dyes, auxiliary chemicals, enzymes, surfactants, oxidizing and reducing agents, crude oil, effluents from textile and dyeing industry, lignin, caustic pulp, black liquor, phospholipids, free fatty acids, waxes, coloring pigments and such like.

The following examples are given as a specific illustration of the invention. However, the invention is not limited to the details of these examples.

EXAMPLE 1

ABPBI was synthesized by self condensation of 3,4-diaminobenzoic acid (DABA) in polyphophoric acid (PPA) as shown in Scheme 1 below.

Scheme 1: Synthetic route of ABPBI

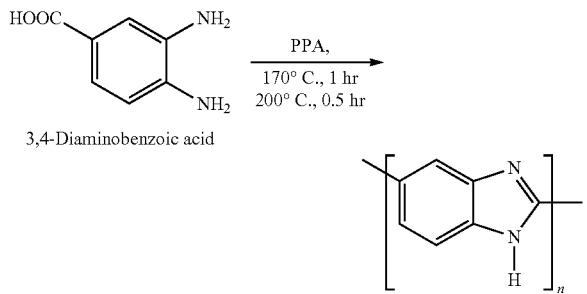

A three necked 1 liter round-bottom flask equipped with an overhead stirrer, $N_2$ inlet and $CaCl_2$ guard tube was charged with PPA (polyphosphoric acid) (500 g) and heated at 170° C. DABA (3,4 diamino benzoic acid) (25 g) was added with continuous stirring and heating continued for 1 hour. The temperature was raised to 200° C. and allowed to stir for 30 minutes. Then reaction mixture was precipitated in water, the polymer thus obtained was crushed and thoroughly washed with water till neutral to pH. It was then kept in 10% NaOH solution for 16 hours, washed with water till neutral to pH, soaked in acetone for 15 hour and dried in vacuum oven at 80° C. for 24 hours.

EXAMPLE 2

The dope solution of ABPBI was prepared by dissolving 4 g of polymer as obtained in example 1 into 100 g of methane sulfonic acid (MSA) at 70° C. The solution was stirred under dry atmosphere for 48 hours. The formed solution was cooled at ambient (at 27° C.) and then degassed to remove trapped gases. This dope solution was casted on to a non-woven polypropylene fabric (FO2470) with air-dry time of 8 sec, before it entered into the gelation bath containing water as the non-solvent at 20° C. The formed membrane was designated as M-6. The thickness of the formed membrane was ~200μ. Water flux of this membrane is given in Table 1 while MWCO is given in FIG. 1.

EXAMPLE 3

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membranes were prepared on polypropylene (FO2470) non-woven support fabric. Membranes were casted at 20° C. gelation temperature and exposed in air for 8 seconds prior to dipping in the non solvent bath. The non solvent used was water. The formed membrane was designated as M-1. The thickness of the formed membrane was ~200μ. Water flux of this membrane is given in Table 1 while MWCO is given in FIG. 1.

EXAMPLE 4

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membrane was prepared on FO2470 non-woven support fabric and was designated as M-5. Membranes were casted at 20° C. gelation temperature and exposed in air for 8 seconds prior to dipping in the non solvent bath. The non solvent used was 0.5 N NaOH. The thickness of the formed membrane was ~200μ. Water flux of this membrane is given in Table 1 while MWCO is given in FIG. 1.

EXAMPLE 5

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membranes were prepared on polypropylene (FO2470) non-woven support fabric. Membranes were casted at 10° C. gelation temperature and exposed in air for 32 seconds prior to dipping in the non solvent bath. The non solvent used was water. The formed membrane was designated as M-7. The thickness of the formed membrane was ~200μ. Water flux of this membrane is given in Table 2.

EXAMPLE 6

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membranes were prepared on polypropylene (FO2470) non-woven support fabric. Membranes were casted at 10° C. gelation temperature and exposed in air for 64 seconds prior to dipping in the non solvent bath. The non solvent used was water. The formed membrane was designated as M-8. The thickness of the formed membrane was ~200μ. Water flux of this membrane is given in Table 2.

EXAMPLE 7

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membranes were prepared on polypropylene (FO2470) non-woven support fabric. Membranes were casted at 40° C. gelation temperature and exposed in air for 32 seconds prior to dipping in the non solvent bath. The non solvent used was water. The formed membrane was designated as M-9. The thickness of the formed membrane was ~200μ. Water flux of this membrane is given in Table 2.

EXAMPLE 8

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membranes were prepared on polypropylene (FO2470) non-woven support fabric. Membranes were casted at 40° C. gelation temperature and exposed in air for 64 seconds prior to dipping in the non solvent bath. The non solvent used was water. The membrane was designated as M-10. The thickness of the formed membrane was ~200μ. Water flux of this membrane is given in Table 2.

EXAMPLE 9

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membranes were prepared on polypropylene (FO2470) non-woven support fabric. Membranes were casted at 60° C. gelation temperature and exposed in air for 32 seconds prior to dipping in the non solvent bath. The non solvent used was water. The formed membrane was designated as M-11. The thickness of the formed membrane was ~200μ. Water flux of this membrane is given in Table 2.

EXAMPLE 10

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membranes were prepared on polypropylene (FO2470) non-woven support fabric. Membranes were casted at 60° C. gelation temperature and exposed in air for 64 seconds prior to dipping in the non solvent bath. The non solvent used was water. The formed membrane was designated as M-12. The thickness of the formed membrane was ~200μ. Water flux of this membrane is given in Table 2.

EXAMPLE 11

Figure 2:
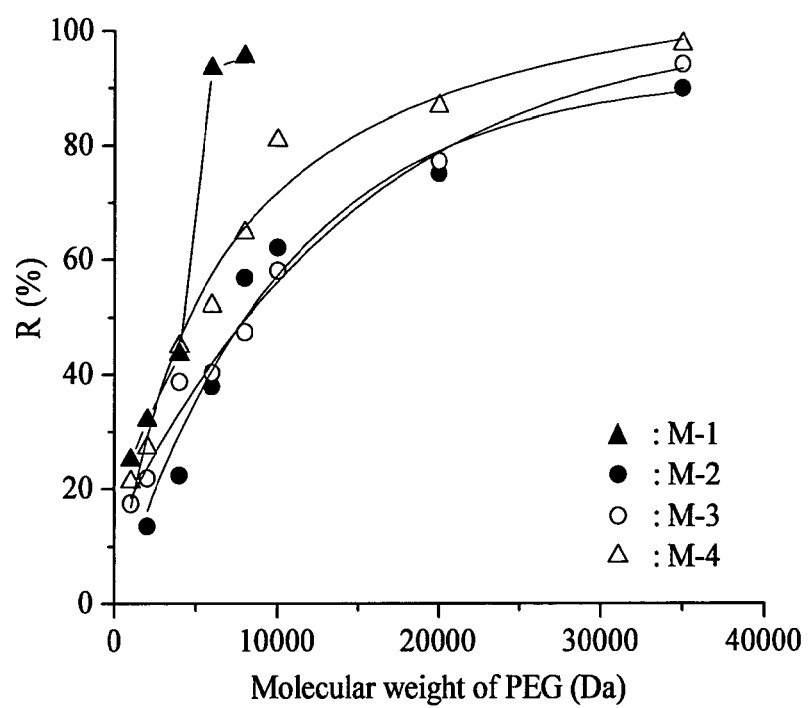
FIG. 2 shows rejection (R) of membranes prepared using different supports and 6% ABPBI in dope solution.

The dope solution of ABPBI was prepared by dissolving 6 g of polymer into 100 g of methane sulfonic acid (MSA) at 70° C. The solution was stirred under dry atmosphere for 48 hours. The formed solution was cooled at ambient and then degassed to remove trapped gases. Membranes were prepared on polyester H3160, 3324 and 3265 non-woven support fabric and designated as M-2, M-3 and M-4 respectively. Membranes were casted at 20° C. gelation temperature and exposed in air for 8 seconds prior to dipping in the non solvent bath. The non solvent used was water. The thickness of the formed membrane was ~200μ. Water flux of this membrane is given in Table 1 while MWCO is given in FIG. 2.

EXAMPLE 12

The stability in different organic solvents (DMF, DMAc, IPA, hexane, chloroform, toluene and THF) and autoclaving condition (at 15 psi pressure and 121° C. for 20 min.) was analyzed by using membranes of Example 2. Solvent flux through the membrane was measured after dipping into the respective solvent for 24 hours. In case of water immiscible solvents like chloroform, toluene and hexane, membranes were dipped initially in IPA (24 hours) and then in the respective solvents (24 hours). Effect of solvent treatment on the membrane morphology was analyzed by measuring water flux after the solvent treatment and compared with initial flux. Membranes showed excellent stability in almost all solvents except hexane. The results are summarized in Table 3.

EXAMPLE 13

The stability in hexane was analyzed by using membranes of Example 3 and 11. Change in water flux was measured by following the procedure as given in Example 12. The results are summarized in Table 4.

EXAMPLE 14

The stability in 25N $H_2SO_4$ and 2.5N NaOH was analyzed by using membranes of Example 2 and 3. Change in water flux was measured by following the procedure as given in Example 12. The results are summarized in Table 5.

ADVANTAGES OF THE INVENTION

The main advantage of the present invention is to obtain a stable porous ABPBI membrane that can be used for separation of solutes from solutions in acids, bases and organic solvents.

Another advantage of the invention is to prepare membrane by varying its membrane preparation parameters to improve membrane performance.

Yet another advantage of the present invention to provide a single membrane which has a potential to withstand harsh environmental conditions such as concentrated acid, base, organic solvents and autoclaving conditions without need of any treatment processes such as cross linking, annealing and such like.

The advantages of the disclosed invention are thus attained in an economical, practical, and facile manner. While preferred aspects and example configurations have been shown and described, it is to be understood that various further modifications and additional configurations will be apparent to those skilled in the art. It is intended that the specific embodiments and configurations herein disclosed are illustrative of the preferred nature and best mode of practicing the invention, and should not be interpreted as limitations on the scope of the invention.

TABLE 1

Water flux analysis of membranes prepared using different porous supports.

| Polymer concentration in dope solution (%) | Membrane code | Support used | Nonsolvent used | Water flux, $J_w$, at 2 bar ($l \cdot m^{-2} \cdot h^{-1}$) |
|---|---|---|---|---|
| 6 | M-1 | FO2470 | Water | 16.3 ± 2.8 |
|   | M-2 | H3160 | Water | 3.0 ± 0.6 |
|   | M-3 | 3324 | Water | 3.2 ± 0.1 |
|   | M-4 | 3265 | Water | 5.3 ± 0.8 |
|   | M-5 | FO2470 | NaOH | 9.3$^a$ ± 0.7 |
| 4 | M-6 | FO2470 | Water | 30.2 ± 6.6 |

$^a$At 1 bar pressure.

TABLE 2

Effect of air dry time and coagulation bath temperature on membrane flux.

| | Gelation temperature (° C.) | | | | | |
|---|---|---|---|---|---|---|
| | 10 | | 40 | | 60 | |
| | Air dry time (sec) | | | | | |
| | 32 | 64 | 32 | 64 | 32 | 64 |
| Membrane code | M-7 | M-8 | M-9 | M-10 | M-11 | M-12 |
| water flux at 1 bar ($l \cdot m^{-2} \cdot h^{-1}$) | 2.3, 2.94 | 2.36 | 2.87, 3.29 | 1.94 | 3.77, 2.15 | 2.56 |

TABLE 3

Stability of membrane M-6 towards organic solvents.

| Solvent used | $J_{solvent}$ ($l \cdot m^{-2} \cdot h^{-1} \cdot bar^{-1}$) | % Reduction in membrane thickness | % Change in $J_w$ |
|---|---|---|---|
| DMF | 14.7 | 8 | 13.46 |
| DMAc | 6.6 | 15 | 10.11 |
| IPA | 7.0 | 4 | 8.68 |
| Chloroform | 13.6 | 33 | −59.42 |
| THF | 33.3 | 9 | −12.84 |
| Toluene | 12.7 | 27 | −59.23 |
| Hexane | $c$ | 20 | — |
| Autoclaving | — | 13 | −14.51 |

TABLE 4

Hexane stability of membranes prepared using different porous supports.

| Membrane code | % Reduction in membrane thickness | % Change in $J_w$ |
|---|---|---|
| M-1 | 16.0 | Delaminated |
| M-2 | 57.5 | −61.6 |
| M-3 | 22.6 | −41.1 |
| M-4 | 28.8 | −69.3 |

TABLE 5

Change in water flux after treatment of concentrated acid and base.

| | 25N $H_2SO_4$ treatment | | 2.5N NaOH treatment | |
|---|---|---|---|---|
| Membrane code | % Reduction in membrane thickness | % Change in $J_w$ | % Reduction in membrane thickness | % Change in $J_w$ |
| M-1 | 22.9 | −23.7 | 12.7 | −7.3 |
| M-6 | 26.0 | −36.1 | 11.5 | −1.5 |

We claim:

1. A process for the preparation of a porous ABPBI membrane, the process comprising:
    dissolving an ABPBI polymer in a solvent to form a dope solution;
    casting a film of the dope solution;
    holding the film in air up to 5 minutes in ambient condition; and
    coagulating the held film in a non solvent bath at temperature up to 150° C. to obtain the porous membrane;
    wherein the membrane is stable to acids, bases, organic solvents and autoclaving.

2. The process of claim 1, wherein the solvent is selected from the group consisting of concentrated methane sulfonic acid, concentrated sulfuric acid, concentrated phosphoric acid, concentrated formic acid, concentrated trifluoro acetic acid, concentrated poly(phosphoric acid), and mixtures thereof 3. The process of claim 1, wherein the solvent comprises a mixture of solvents.

4. The process of claim 1, further comprising heating the solvent to dissolve the polymer.

5. The process of claim 1, wherein casting comprises casting the membrane on a support selected from the group consisting of glass, polyester, polypropylene, polyethylene, polyetheretherketone, a metallic plate, and a ceramic.

6. The process of claim 1, wherein the non solvent is selected from water, alcohol, and base solution.

7. The process of claim 1, wherein, the solvent comprises methane sulfonic acid, sulfuric acid, phosphoric acid, formic acid, trifluoro acetic acid, poly(phosphoric acid), or a mixture thereof 8. The process of claim 1, wherein casting comprises casting on a porous support.

9. The process of claim 6, wherein the non solvent comprises inorganic base.

10. A process for the preparation of a porous ABPBI membrane, the process comprising:
    dissolving an ABPBI polymer in a solvent to form a dope solution;
    casting a film of the dope solution;
    holding the film in air up to 5 minutes in ambient condition; and
    coagulating the held film in a bath comprising non solvent and solvent at temperature up to 150° C. to obtain the porous membrane;
    wherein the membrane is stable to acids, bases, organic solvents and autoclaving.

* * * * *